US009463882B1

(12) United States Patent
Field et al.

(10) Patent No.: US 9,463,882 B1
(45) Date of Patent: Oct. 11, 2016

(54) SYSTEM AND METHOD FOR ASSEMBLING AND DEPLOYING SATELLITES

(71) Applicant: WorldVu Satellites Limited, St Helier, Jersey (CH)

(72) Inventors: Daniel W. Field, Sunnyvale, CA (US); Armen Askijian, Sunnyvale, CA (US); James Grossman, Sunnyvale, CA (US); Alexander D. Smith, San Jose, CA (US)

(73) Assignee: WorldVu Satellites Limited (GB)

( * ) Notice: Subject to any disclaimer, the term of this patent is extended or adjusted under 35 U.S.C. 154(b) by 0 days.

(21) Appl. No.: 14/700,504

(22) Filed: Apr. 30, 2015

(51) Int. Cl.
| | |
|---|---|
| G01C 23/00 | (2006.01) |
| G05D 1/00 | (2006.01) |
| G05D 3/00 | (2006.01) |
| G06F 7/00 | (2006.01) |
| G06F 17/00 | (2006.01) |
| B64G 1/64 | (2006.01) |
| B64G 1/24 | (2006.01) |

(52) U.S. Cl.
CPC ............... B64G 1/641 (2013.01); B64G 1/24 (2013.01); B64G 2001/643 (2013.01)

(58) Field of Classification Search
CPC ........ B64G 1/641; B64G 1/24; B64G 1/645; B64G 2001/643; B64G 9/00
See application file for complete search history.

(56) References Cited

U.S. PATENT DOCUMENTS

| | | | | |
|---|---|---|---|---|
| 5,411,226 A * | 5/1995 | Jones | ..................... | B64G 1/641 244/173.3 |
| 6,138,951 A * | 10/2000 | Budris | ..................... | B64G 1/002 102/393 |
| 6,276,639 B1 * | 8/2001 | Hornung | ................. | B64G 1/002 102/489 |
| 6,416,018 B2 * | 7/2002 | DiVerde | ................. | B64G 1/002 244/137.1 |
| 7,219,858 B2 * | 5/2007 | Sharer | .................. | B64G 1/1085 244/158.4 |
| 2002/0000495 A1 * | 1/2002 | Diverde | ................ | B64G 1/002 244/137.1 |
| 2002/0179776 A1 * | 12/2002 | Mueller | ................. | B64G 1/007 244/158.5 |
| 2008/0237399 A1 * | 10/2008 | Caplin | ................. | B64G 1/1085 244/158.4 |
| 2014/0319283 A1 * | 10/2014 | Holemans et al. | .... | B64G 1/641 244/173.3 |

FOREIGN PATENT DOCUMENTS

FR  2805245 A1 *  8/2001

OTHER PUBLICATIONS

Kaitlyn Kelly; Launch Systems to Support the Booming Nanosatellite Industry; 2015 IEEE Aerospace Conf.; Big Sky, MT; Mar. 7-14, 2015; pp. 1-6.*

Authorized Officer: Chris Grant, "International Search Report and Written Opinion" dated Jul. 12, 2016 in related PCT Application No. PCT/US16/29518, Publisher: PCT, Published in: US.

* cited by examiner

*Primary Examiner* — Michael J Zanelli
(74) *Attorney, Agent, or Firm* — Kaplan Breyer Schwarz & Ottesen, LLP (57) ABSTRACT

A satellite deployment system has a plurality of releasable dispenser modules that are attached to each other with each module carrying satellites. Each dispenser module acts as an individual final stage with its own propulsion unit and deploys a subset of satellites to the appropriate altitude and orbit. Since each dispenser module can deploy its satellites far from other dispenser modules, the risk of collision among the satellites is greatly reduced, which allows a large number of satellites to be launched in a safe, timely and cost-effective manner.

22 Claims, 6 Drawing Sheets

SYSTEM AND METHOD FOR ASSEMBLING AND DEPLOYING SATELLITES

TECHNICAL FIELD

The present invention is related to satellites, and in particular, a system and method for assembling and deploying multiple satellites from a launch vehicle.

BACKGROUND OF THE INVENTION

Satellites typically use multistage launch vehicles such as a rocket to reach an insertion orbit before they individually separate and fly to their final operational orbit. As the launch vehicle has a limited amount of power and propulsion, all satellites in the payload should be deployed within a relatively small time window, typically within a few hours.

When there are more than a few satellites in the payload, e.g., ten or more satellites in the payload, deploying satellites in relatively quick succession within the allowed time window is difficult because of the close proximity and inherent risks of a potential collision between satellites before their attitude control and propulsion systems become active.

Therefore, there is a need to provide an improved system and method for assembling and deploying a large number satellites in a safe, timely and cost-effective manner.

SUMMARY OF THE DISCLOSURE

According to one aspect of the present invention, a satellite deployment system having a plurality of releasable dispenser modules is provided. The releasable dispenser modules are releasably attached to each other and each dispenser module supports at least one satellite to be deployed in orbit. A controller controls the release of each dispenser module from a launch vehicle and deployment of the satellites from each released dispenser module.

In another aspect of the present invention, a method of deploying the releasable dispenser modules is provided. The launch vehicle containing the satellites is positioned at a predetermined position in space. Then, the dispenser modules are individually and sequentially released from the launch vehicle. Each released dispenser module then moves to a predetermined location by flying to the location. Once there, the released dispenser module releases the satellites attached thereto.

Each dispenser module separates from the launch vehicle at a specified insertion orbit and then acts as its own individual final stage to take a subset of satellites to the appropriate altitude and orbital parameters and then deploy the individual satellites. As each dispenser module can deploy its satellites far from other dispenser modules, the risk of a collision between satellites is greatly reduced which allows a large number of satellites to be launched in safe, timely and cost-effective manner.

DETAILED DESCRIPTION OF THE INVENTION

Figure 1:
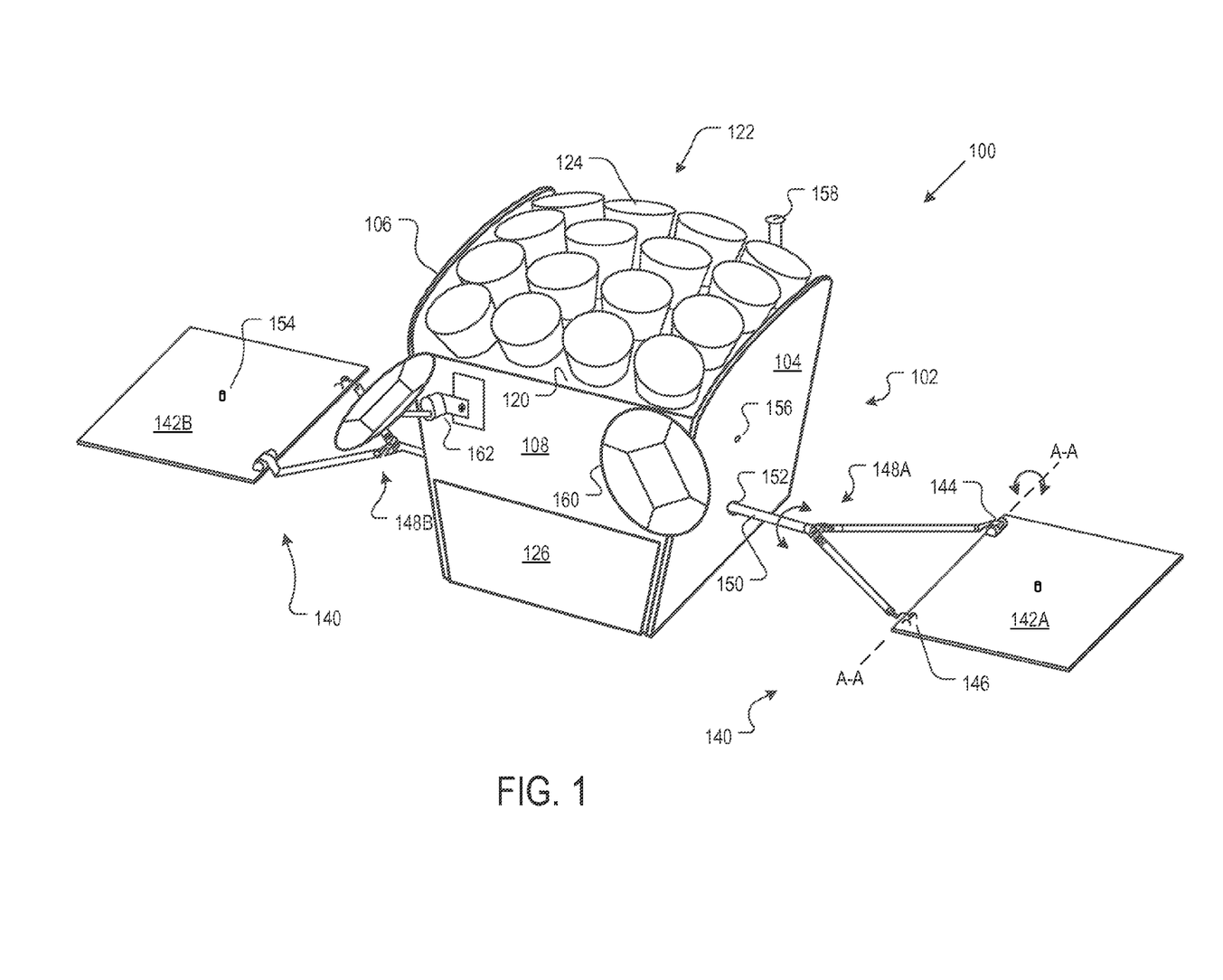
FIG. 1 depicts a perspective view of a satellite in accordance with one aspect of the present invention.
Figure 2:
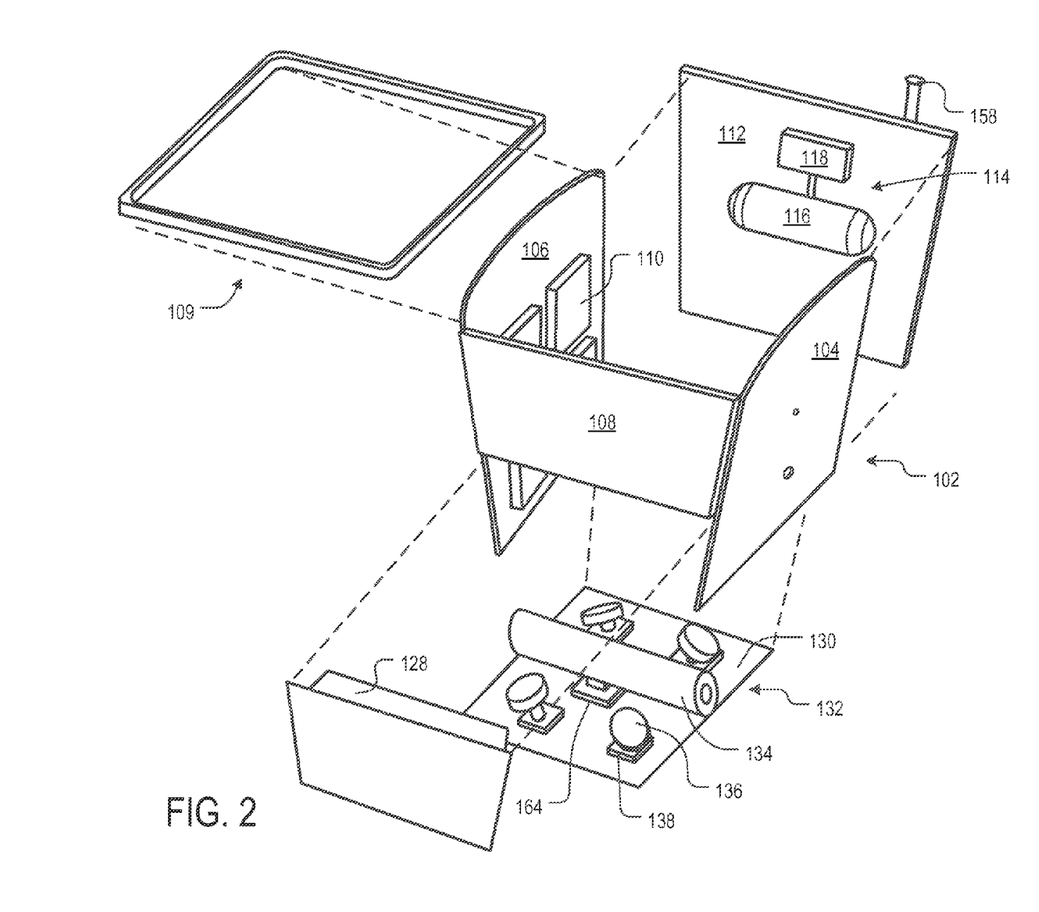
FIG. 2 depicts an exploded perspective view of some parts of the satellite of FIG. 1.

FIG. 1 depicts satellite 100 in accordance with the present teachings. FIG. 2 depicts an "exploded" view of some of the salient features of satellite 100. Referring now to both FIGS. 1 and 2, satellite 100 includes unified payload module 102, propulsion module 114, payload antenna module 122, bus component module 132, and solar-array system 140, arranged as shown. It is to be noted that the orientation of satellite 100 in FIGS. 1 and 2 is "upside down" in the sense that in use, antennas 124, which are facing "up" in the figures, would be facing "down" toward Earth.

Unified payload module 102 comprises panels 104, 106, and 108. In some embodiments, the panels are joined together using various connectors, etc., in known fashion. Brace 109 provides structural reinforcement for the connected panels.

Panels 104, 106, and 108 serve, among any other functionality, as radiators to radiate heat from satellite 102. In some embodiments, the panels include adaptations to facilitate heat removal. In some embodiments, the panels comprise plural materials, such as a core that is sandwiched by face sheets. Materials suitable for use for the panels include those typically used in the aerospace industry. For example, in some embodiments, the core comprises a lightweight aluminum honeycomb and the face sheets comprise 6061-T6 aluminum.

Propulsion module 114 is disposed on panel 112, which, in some embodiments, is constructed in like manner as panels 104, 106, and 108 (e.g., aluminum honeycomb core and aluminum facesheets, etc.). Panel 112, which is obscured in FIG. 1, abuts panels 104 and 106 of unified payload module 102.

Propulsion module 114 includes fuel tank 116 and propulsion control system 118. The propulsion control system controls, using one or more valves (not depicted), release of propulsion gas through the propulsion nozzle (not depicted) that is disposed on the outward-facing surface of panel 114. Propulsion control system is appropriately instrumented (i.e., software and hardware) to respond to ground-based commands or commands generated onboard from the control processor.

Payload antenna module 122 comprises a plurality of antennas 124. In the illustrative embodiments, sixteen antennas 124 are arranged in a 4×4 array. In some other embodiments, antennas 124 can be organized in a different arrangement and/or a different number of antennas can be used. Antennas 124 are supported by support web 120. In some embodiments, the support web is a curved panel comprising carbon fiber, with a suitable number of openings (i.e., sixteen in the illustrative embodiment) for receiving and supporting antennas 124.

In some embodiments, antennas 124 transmit in the $K_u$ band, which is the 12 to 18 GHz portion of the electromagnetic spectrum. In the illustrative embodiment, antennas 124 are configured as exponential horns, which are often used for communications satellites. Well known in the art, the horn antenna transmits radio waves from (or collects them into) a waveguide, typically implemented as a short rectangular or cylindrical metal tube, which is closed at one end and flares into an open-ended horn (conical shaped in the illustrative embodiment) at the other end. The waveguide portion of each antenna 124 is obscured in FIG. 1. The closed end of each antenna 124 couples to amplifier(s) (not depicted in FIGS. 1 and 2; they are located on the interior surface of panel 104 or 108).

Bus component module 132 is disposed on panel 130, which attaches to the bottom (from the perspective of FIGS. 1 and 2) of the unified payload module 102. Panel 130 can be constructed in like manner as panels 104, 106, and 108 (e.g., aluminum honeycomb core and aluminum facesheets, etc.). In some embodiments, panel 130 does not include any specific adaptations for heat removal.

Module 132 includes main solar-array motor 134, four reaction wheels 136, and main control processor 164. The reaction wheels enable satellite 100 to rotate in space without using propellant, via conservation of angular momentum. Each reaction wheel 136, which includes a centrifugal mass (not depicted), is driven by an associated drive motor (and control electronics) 138. As will be appreciated by those skilled in the art, only three reaction wheels 136 are required to rotate satellite 100 in the x, y, and z directions. The fourth reaction wheel serves as a spare. Such reaction wheels are typically used for this purpose in satellites.

Main control processor 164 processes commands received from the ground and performs, autonomously, many of the functions of satellite 100, including without limitation, attitude pointing control, propulsion control, and power system control.

Solar-array system 140 includes solar panels 142A and 142B and respective y-bars 148A and 148B. Each solar panel comprises a plurality of solar cells (not depicted; they are disposed on the obscured side of solar panels 142A and 142B) that convert sunlight into electrical energy in known fashion. Each of the solar panels includes motor 144 and passive rotary bearing 146; one of the y-bar attaches to each solar panel at motor 144 and bearing 146. Motors 144 enable each of the solar panels to at least partially rotate about axis A-A. This facilitates deploying solar panel 142A from its stowed position parallel to and against panel 104 and deploying solar panel 142B from its stowed position parallel to and against panel 106. The motors 144 also function to appropriately angle panels 142A and 142B for optimal sun exposure via the aforementioned rotation about axis A-A.

Member 150 of each y-bar 148A and 148B extends through opening 152 in respective panels 104 and 106. Within unified payload module 102, members 150 connect to main solar-array motor 134, previously referenced in conjunction with bus component module 132. The main solar-array motor is capable of at least partially rotating each member 150 about its axis, as shown. This is for the purpose of angling solar panels 142A and 142B for optimal sun exposure. In some embodiments, the members 150 can be rotated independently of one another; in some other embodiments, members 150 rotate together. Lock-and-release member 154 is used to couple and release solar panel 142A to side panel 104 and solar panel 142B to side panel 106. The lock-and-release member couples to opening 156 in side panels 104 and 106.

Satellite 100 also includes panel 126, which fits "below" (from the perspective of FIGS. 1 and 2) panel 108 of unified payload module 102. In some embodiments, panel 108 is a sheet of aerospace grade material (e.g., 6061-T6 aluminum, etc.) Battery module 128 is disposed on the interior-facing surface of panel 126. The battery module supplies power for various energy consumers onboard satellite 100. Battery module 128 is recharged from electricity that is generated via solar panels 142A and 142B; the panels and module 128 are electrically coupled for this purpose (the electrical path between solar panels 142A/B and battery module 128 is not depicted in FIGS. 1 and 2).

Satellite 100 further includes omni-directional antenna 158 for telemetry and ground-based command and control.

Disposed on panel 108 are two "gateway" antennas 160. The gateway antennas send and receive user data to gateway stations on Earth. The gateway stations are in communication with the Internet. Antennas 160 are coupled to panel 108 by movable mounts 162, which enable the antennas to be moved along two axes for optimum positioning with ground-based antennas. Antennas 160 typically transmit and receive in the $K_a$ band, which covers frequencies in the range of 26.5 to 40 GHz.

Convertor modules 110, which are disposed on interior-facing surface of panel 106, convert between $K_a$ radio frequencies and $K_u$ radio frequencies. For example, convertor modules 110 convert the $K_a$ band uplink signals from gateway antennas 160 to $K_u$ band signals for downlink via antennas 124. Convertor modules 110 also convert in the reverse direction; that is, $K_u$ to $K_a$.

In operation of satellite 100, data flows as follows for a data request:
- (obtain data): requested data is obtained from the Internet at a gateway station;
- (uplink): a data signal is transmitted (Ka band) via large, ground-based antennas to the satellite's gateway antennas 160;
- (payload): the data signal is amplified, routed to convertor modules 110 for conversion to downlink (Ku) band, and then amplified again;
- the payload signal is routed to payload antennas 124;
- (downlink): antennas 124 transmit the amplified, frequency-converted signal to the user's terminal.

When a user transmits (rather than requests) data, such as an e-mail, the signal follows the same path but in the reverse direction.

Briefly, the embodiment described herein is a satellite deployment system in which a dispenser consists of multiple dispenser modules in the form of dispenser rings that are attached to each other prior to launch. Each ring supports and carries many individual and identical satellites. The system is designed to take a launch vehicle from a given insertion orbit to a single or multiple final orbit by releasing the dispenser rings individually. Each dispenser ring separates from the launch vehicle at a specified insertion orbit and then acts as an individual final stage, complete with power and propulsion, to take a subset of satellites to the appropriate altitude and orbital parameters and then deploying the individual satellites. Each dispenser ring can deploy its satellites far from other dispenser rings, thereby reducing the separation risk by the total number of rings. Multiple rings can go to the same or different orbits by varying the final altitude, RAAN and inclination. The embodiment described herein is particularly suitable for LEO and MEO satellites where tens or even hundreds of satellites are launched in a single payload.

Figure 3:
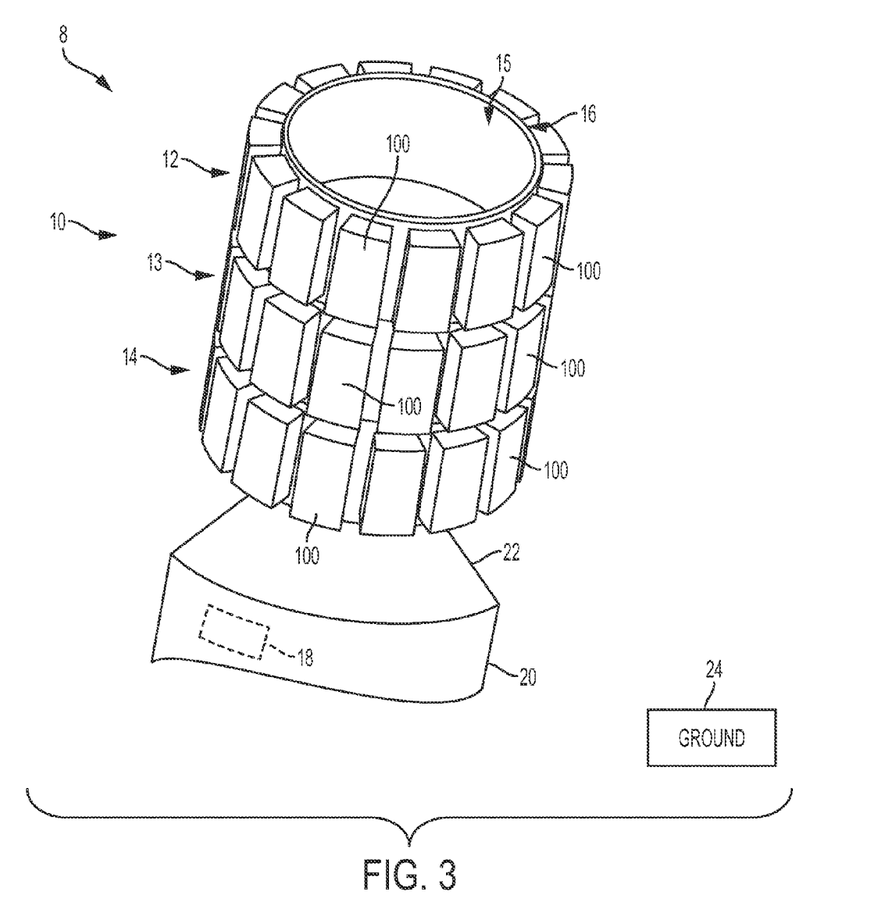
FIG. 3 depicts a perspective view of a satellite deployment system in accordance with one aspect of the present invention.

FIG. 3 depicts a perspective view of a satellite deployment system 8 in accordance with one aspect of the present invention. The system 8 includes a dispenser 10 comprised of multiple satellite dispenser modules 12,13,14 that are attached to and stacked on top of each other. Each dispenser module 12-14 is in a form of a ring and supports satellites 100 that are to be deployed into orbit. In the embodiment shown, 14 identical satellites 100 are releasably attached to the associated dispenser module 12-14. The dispenser 10 is releasably attached to an upper stage 20 of a launch vehicle by a payload adapter fitting (PAF) 22. Although only three dispenser rings 12-14 have been shown for illustration purposes, persons of ordinary skill in the art will appreciate that many more dispenser rings can be stacked together depending on the particular launch vehicle used, and the satellite mass and size.

A payload controller 18 and a ground station controller 24 (a computer) are in communication with each other and control the release of the dispenser modules 12-14.

Figure 4A:
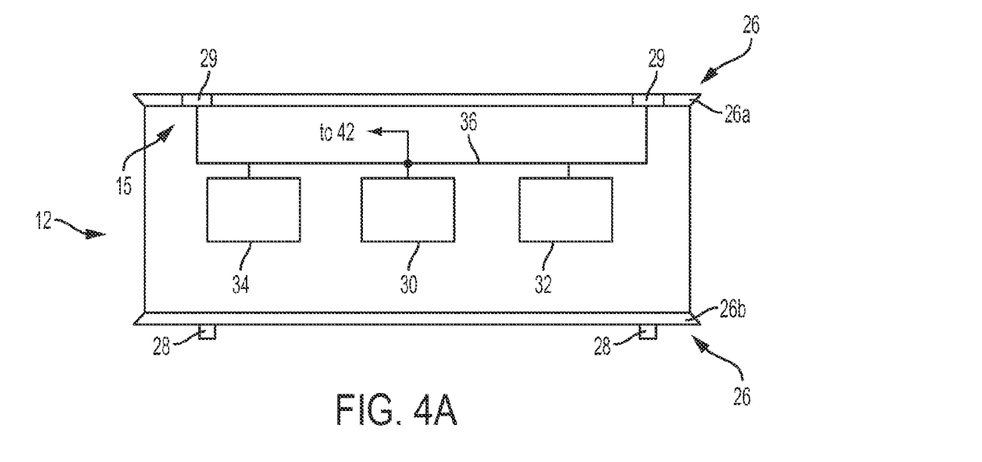
FIGS. 4A and 4B respectively depict a portion of an inner surface and an outer surface of a dispenser module in accordance with one aspect of the present invention.
Figure 4B:
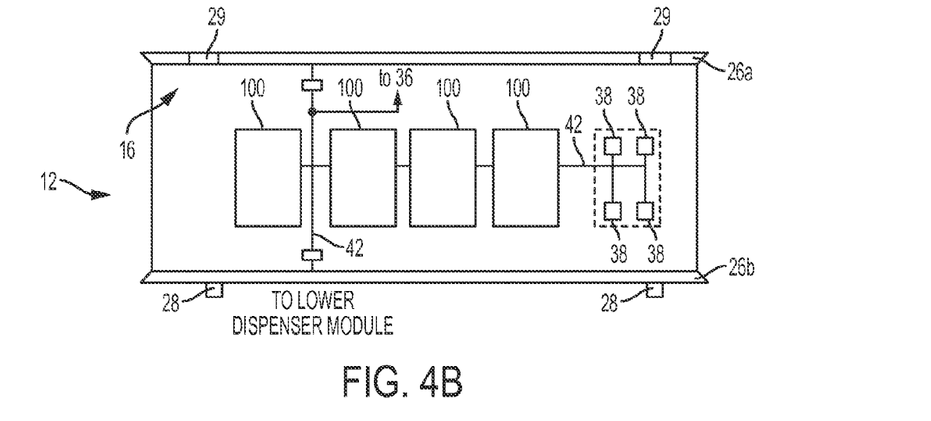

FIGS. 4A and 4B respectively depict a portion of an inner surface 14 and an outer surface 16 of a dispenser module 12 in accordance with one aspect of the present invention. Each module 12-14 includes a separation mechanism 26 which releasably attaches two adjacent dispenser modules together. For the bottom dispenser module 14 attached to the PAF 22, the same separation mechanism 26 can be used. One exemplary separation mechanism 26 can be a Lightband separation system which is available from Planetary Systems Corporation of Silver Spring, Md.

In the embodiment shown, each separation mechanism 26 includes a top ring 26a and a bottom ring 26b. The bottom ring 26b has a plurality of protrusions 28 that are locked inside a corresponding recess within a releasable lock 29 of the dispense module 12-14 above. In some embodiments, a plurality of loaded springs (not shown) are positioned between the two rings 26a,26b so that when the dispenser module 12-14 is released, the released module is propelled away from the launch vehicle.

On the inner surface 15, each dispenser module 12-14 has its own dispenser module controller 30, propulsion unit 32 and attitude control unit 34 that are connected to each other through an electrical line 36.

As shown in FIG. 4B, on the outer surface 16, a plurality of satellites 100 are attached to each module 12-14 through a separation assembly 38. For each satellite 100, four separation assemblies 38 are used to releasably lock the four connector bolt 40 of the satellite 100 (see FIG. 4C). An exemplary separation assembly may be a series SN9400 low shock separation assembly manufactured by Hi-Shear Technology Corp. of Torrance, Calif.

An electrical wire 42 connects all of the separation assemblies 38 together and is connected to the wire 36 on the inner surface 15 of the module 12-14 for communication with the module controller 30. The wire 36 of each dispenser module 12-14 is connected to each other and to the payload controller 18 (a computer). The dispenser module controller 30 is a computer that controls the propulsion unit 32 and the attitude control unit 34 as well as the release of the satellites 100 into space once the module is released from the launch vehicle.

Figure 5A:
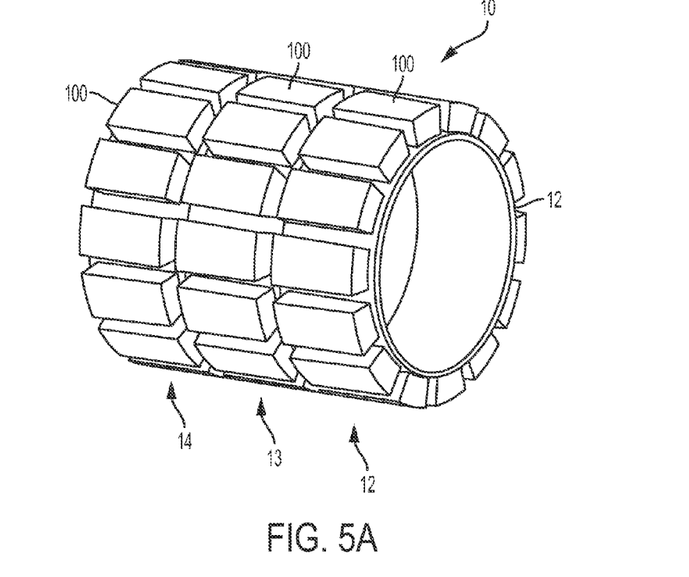
FIG. 5A depicts a perspective view of a satellite dispenser having multiple dispenser modules according to one aspect of the present invention.

A method of assembling a payload according to one aspect of the invention will now be described. Starting with the bottom dispenser module 14, an adjacent module 13 is stacked on top of the bottom module and is attached to the bottom module with the separation mechanism 26. Then, the top dispenser module 12 is stacked on top of the middle dispenser module 13 and is attached to the middle module with the separation mechanism 26. If there are more dispenser modules, the process of stacking and attaching is repeated until all of the dispenser modules are stacked and releasably attached to each other.

Figure 4C:
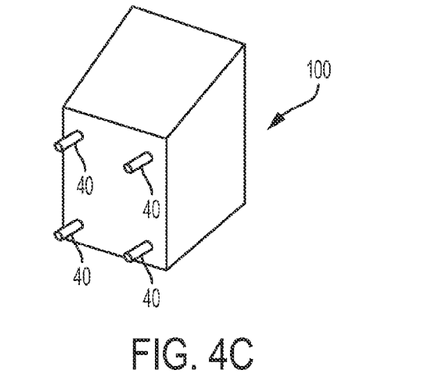
FIG. 4C depicts a perspective view illustrating the backside of the satellite of FIG. 1.

The satellites 100 are then attached to their respective slots such that the connector bolts 40 are releasably attached to the separation assembly 38. When the payload is ready to be launched, the dispenser 10 with the satellites 100 thereon is hoisted up and releasably attached to the PAF 22. In one embodiment, the same separation mechanism 26 for attaching the dispenser modules 12-14 together can also be used to attach the bottom dispenser module 14 to the PAF 22.

Figure 5B:
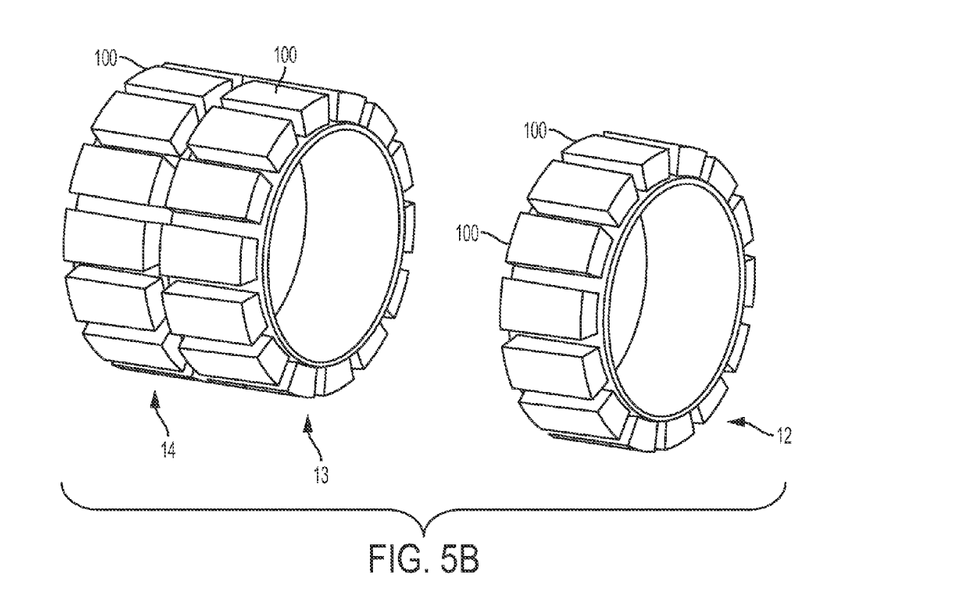
FIG. 5B depicts a perspective view of the satellite dispenser of FIG. 5A, in which the top dispenser module has been released from the launch vehicle.
Figure 5C:
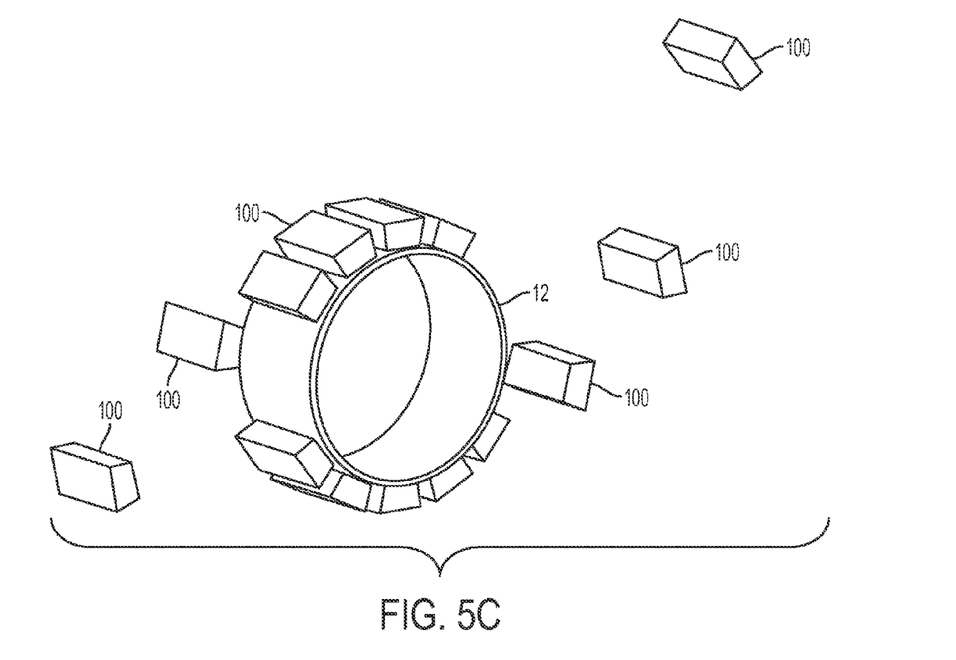
FIG. 5C depicts a perspective view of the released dispenser module of FIG. 5B, in which several satellites have been released from the released dispenser module.

FIGS. 5A-5C illustrate the sequential separation of dispenser modules and release of satellites according to one embodiment of the present invention. For clarity, some of the components on the inner and outer surfaces 15-16 have been omitted. As shown in FIG. 5A, under the control of the ground station controller 24 and payload controller 18, the launch vehicle is positioned at a predetermined position to release the first dispenser module 12. At this point, all of the dispenser modules 12-14 are still attached to the launch vehicle. Control of the dispenser module release can be done by the payload controller 18, the dispenser module's own module controller 30 or by both. In either case, the release can be automatically performed by the controllers 18,30 or on command received from the ground station controller 24. In the embodiment shown, the ground station controller 24 transmits all of the dispenser module release commands to the controller 18 which then relays the commands to the appropriate dispenser module controller 30 through the electrical wire 36.

The control software that controls the launch vehicle, positioning and sequential releasing of the dispenser modules 12-14 and releasing of individual satellites 100 attached to each released module is stored in a computer readable storage memory (medium) of the controllers 18,24,30.

When the launch vehicle reaches the appropriate position (insertion orbit for the top dispenser module 12), the ground controller 24 transmits a command to release the top dispenser module. Upon receipt, the payload controller 18 send an appropriate command to the dispenser module controller 30 of the dispenser module 14. The controller 30 then sends a signal through the electrical wire 36 to release the locks 29. When the locks 29 are released, the dispenser module 12 moves away from the launch vehicle and the remaining dispenser modules as shown in FIG. 5B. Once the dispenser module 12 has been released, the process of reaching the next position (insertion orbit) and releasing the associated dispenser module repeats for each of the remaining modules 13-14.

Once the dispenser module 12 is released, the dispenser module controller 30 for the module 12 controls the propulsion unit 32 and attitude control unit 34 to propel and move the module to a predetermined location (insertion orbit for the first satellite 100 to be released). Once there, the module controller 12 under the control of the ground controller 24 sequentially releases individual satellites 100 by sending a release command to each corresponding separation assembly 38. The time period between the two sequential releases of the satellites 100 is chosen so as to minimize the possibility of a collision with each other. In some embodiments, the module controller 12 under the control of the ground controller 24 moves/positions its dispenser module into an insertion orbit appropriate for each satellite 100 and then releases the satellite 100. The process of positioning and releasing then repeats for each satellite 100 it is carrying.

As shown in FIG. 5C, five satellites 100 have been released. Each satellite 100 in turn uses its own propulsion unit to position itself into its assigned orbit. The process of releasing the satellites 100 repeats until all of the satellites have been released for the dispenser module 12. Once all of the satellites 100 have been released, the dispenser module 12 can be programmed to fall toward the earth to eventually burn up. For the other dispenser modules 13-14, the same steps for positioning and releasing the satellites for the dispenser module 12 are repeated.

As described above, each dispenser module 12-14 acts as an individual final stage with its own propulsion unit and deploys a subset of satellites to the appropriate altitude and orbit. Since each dispenser module can deploy its satellites far from other dispenser modules, the risk of collision among the satellites is greatly reduced.

It is to be understood that the disclosure describes a few embodiments and that many variations of the invention can easily be devised by those skilled in the art after reading this disclosure. For example, while the inventive concepts disclosed herein are particularly suited to LEO and MEO satellites, they can also apply to larger higher orbit satellites. Accordingly, the scope of the present invention is to be determined by the following claims.

What is claimed is:

1. A satellite deployment system comprising:
   a plurality of releasable dispenser modules attached to each other, each releasable dispenser module adapted to support at least one satellite to be deployed in orbit; and
   a controller adapted to:
      release each dispenser module from a launch vehicle; and
      for the each released module, release into space the at least one satellite from the released dispenser module.

2. The satellite deployment system of claim 1, wherein the controller includes a module controller for each dispenser module, the module controller adapted to release the at least one satellite into space.

3. The satellite deployment system of claim 1, wherein:
   the each dispenser module is ring-shaped and is stacked on top of each other; and
   the at least one satellite is releasably attached to an outer surface of the each ring-shaped dispenser module.

4. The satellite deployment system of claim 3, wherein a plurality of satellites are releasably attached to an associated dispenser module.

5. The satellite deployment system of claim 1, further comprising a propulsion unit attached to each dispenser module, wherein the controller includes a module controller for each dispenser module, the module controller adapted to propel the released dispenser module and to release the at least one satellite into space.

6. The satellite deployment system of claim 1, wherein:
   each dispenser module has a protrusion and a recess;
   the recess of the each dispenser module receives the protrusion of a second dispenser module; and
   the recess of a third dispenser module receives the protrusion of the each dispenser module.

7. The satellite deployment system of claim 1, wherein:
   each dispenser module has a plurality of separation mechanisms that releasably attach an adjacent dispenser module to the each dispenser module.

8. The satellite deployment system of claim 1, wherein the controller is adapted to sequentially release the dispenser modules.

9. A non-transitory computer readable storage medium whose content causes the computer to perform the steps of:
   releasing from a launch vehicle a plurality of dispenser modules that are releasably attached to each other, each dispenser module supporting at least one satellite to be deployed in space; and
   for the each released dispenser module, releasing the at least one satellite from the released dispenser module.

10. The non-transitory computer readable storage medium of claim 9, wherein the content causing the computer to perform the steps is stored at least partially in a module controller for each dispenser module.

11. The non-transitory computer readable storage medium of claim 9, wherein the step of releasing the at least one satellite includes sequentially releasing a plurality of satellites that are releasably attached to the each released dispenser module.

12. The non-transitory computer readable storage medium of claim 9, wherein the steps further comprise propelling the each released dispenser module into a predetermined position in space prior to executing the step of releasing the at least one satellite from the released dispenser module.

13. A method of assembling a plurality of satellites for launch into space comprising:
   attaching a plurality of releasable dispenser modules to each other, the attached dispenser modules being individually releasable in space; and
   attaching at least one releasable satellite to each releasable dispenser module.

14. The method of claim 13, further comprising attaching a controller to each dispenser module, each controller adapted to release the at least one satellite attached to the each dispenser module after the dispenser module is released from a launch vehicle.

15. The method of claim 13, wherein:
   the each dispenser module is ring-shaped; and
   the plurality of dispenser modules are stacked vertically on top of each other.

16. The method of claim 15, wherein the step of attaching at least one releasable satellite includes attaching a plurality of satellites on an outer surface of the each ring-shaped dispenser module.

17. The method of claim 13, further comprising attaching a propulsion unit to each dispenser module, the propulsion unit adapted to propel the each released dispenser module and to release the at least one satellite into space.

18. The method of claim 13, wherein each dispenser module has a protrusion and a recess and the step of attaching a plurality of releasable dispenser modules to each other includes:
   inserting the protrusion of a second dispenser module into the recess of one dispenser module; and
   inserting the protrusion of the one dispenser module to the recess of a third dispenser module, wherein each recess of the plurality of dispenser modules is part of a separation mechanism adapted to release the associated protrusion.

19. A method of deploying a plurality of satellites from a launch vehicle having a dispenser attached thereto, the dispenser having a plurality of releasable dispenser modules attached to each other, each releasable dispenser module supporting at least one satellite, the method comprising:
   positioning the launch vehicle at a predetermined position;

sequentially releasing the dispenser modules from the launch vehicle;

for each released dispenser module,
moving the each released module into a predetermined location;
releasing the at least one satellite from the each released module.

20. The method claim 19, wherein:
the each dispenser module is ring-shaped; and
the plurality of dispenser modules are stacked vertically on top of each other.

21. The method of claim 20, wherein the at least one satellite is attached to an outer surface of the each ring-shaped dispenser module.

22. The method of claim 19, wherein the step of moving the each released module into a predetermined location includes controlling a propulsion unit attached to the each released module.

\* \* \* \* \*